(12) United States Patent
Dorius (10) Patent No.: US 8,553,363 B2
(45) Date of Patent: Oct. 8, 2013

(54) AIR-BEARING SURFACE OF HEAD FOR MINIMIZING CONTACT WITH DISK

(75) Inventor: Lee Dorius, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 64 days.

(21) Appl. No.: 13/080,358

(22) Filed: Apr. 5, 2011

(65) Prior Publication Data

US 2012/0257297 A1    Oct. 11, 2012

(51) Int. Cl.
*G11B 5/60* (2006.01)
*G11B 15/64* (2006.01)
*G11B 17/32* (2006.01)
*G11B 21/20* (2006.01)

(52) U.S. Cl.
USPC ................ 360/235.9; 360/236.1

(58) Field of Classification Search
USPC ............................ 360/235.4–237.1
See application file for complete search history.

(56) References Cited

U.S. PATENT DOCUMENTS

| | | | |
|---|---|---|---|
| 5,396,386 A | 3/1995 | Bolasna et al. | |
| 5,396,387 A | 3/1995 | Murray | |
| 5,625,513 A | 4/1997 | Utsunomiya et al. | |
| 5,650,892 A | 7/1997 | Dorius et al. | |
| 5,761,004 A | 6/1998 | Peck | |
| 6,490,135 B1 * | 12/2002 | Sannino et al. | 360/235.8 |
| 6,574,074 B2 | 6/2003 | Bolasna et al. | |
| 6,608,735 B1 | 8/2003 | Serpe et al. | |
| 6,771,468 B1 | 8/2004 | Levi et al. | |
| 7,583,473 B2 | 9/2009 | Bolasna et al. | |
| 7,617,737 B2 | 11/2009 | Zhu et al. | |
| 7,817,378 B2 | 10/2010 | Huang et al. | |
| 2004/0032694 A1 * | 2/2004 | Sun et al. | 360/236.3 |
| 2008/0198509 A1 * | 8/2008 | Bolasna et al. | 360/235.5 |
| 2009/0219651 A1 * | 9/2009 | Zheng et al. | 360/236.5 |
| 2009/0279199 A1 | 11/2009 | Zhang | |
| 2009/0310259 A1 * | 12/2009 | Hanyu | 360/235.6 |
| 2010/0091405 A1 * | 4/2010 | Huang | 360/235.4 |
| 2010/0091406 A1 * | 4/2010 | Huang et al. | 360/235.4 |
| 2010/0128395 A1 * | 5/2010 | Dorius | 360/235.5 |
| 2010/0142092 A1 * | 6/2010 | Bolasna et al. | 360/235.4 |
| 2010/0149692 A1 * | 6/2010 | Fujimaki et al. | 360/235.8 |

OTHER PUBLICATIONS

Hashimoto et al., "Development of a new sub-sub micron flying ramp-loading head with emphasis on slider roll control capability" Magnetics, IEEE Transactions printed on Nov. 25, 2010, vol. 28, No. 5, pp. 2536-2538, Sep. 1992; http://ieeexplore.ieee.org/stamp/stamp.jsp?p+&carnumber=179548&isnumber=4499.

* cited by examiner

*Primary Examiner* — Wayne Young
*Assistant Examiner* — Adam B Dravininkas
(74) *Attorney, Agent, or Firm* — Brokaw Patent Law PC; Christopher J. Brokaw; John D. Henkhaus (57) ABSTRACT

Approaches for a head slider for use within a hard-disk drive. The head slider comprises an air bearing surface (ABS) and an electromagnetic transducer disposed at an air outflow end of the air bearing surface. The air bearing surface comprises an inner (ID) side rail proximate the inner diameter side and an outer (OD) side rail proximate the outer diameter side. The ID side rail is longer in length than the OD side rail. The physical dimensions of the ID side rail have a geometry that reduces a contact force between the head and the magnetic-recording disk when the head experiences a positive roll static attitude (RSA). The physical dimensions of the OD side rail have a geometry that reduces contact force between the head and the magnetic-recording disk when the head experiences a negative RSA.

12 Claims, 6 Drawing Sheets

KEY
402 = Previous design #1
404 = Previous design #2
406 = Present embodiment

AIR-BEARING SURFACE OF HEAD FOR MINIMIZING CONTACT WITH DISK

FIELD OF THE INVENTION

Embodiments of the invention relate to an air-bearing surface (ABS) of a read/write head of a hard-disk drive (HDD) for minimizing contact of the read/write head with a magnetic-recording disk.

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. An actuator relies on suspension's force on the read/write head to provide the proper distance between the read/write head and the surface of the magnetic-recording disk while the magnetic-recording disk rotates. A read/write head therefore is said to "fly" over the surface of the magnetic-recording disk. When the magnetic-recording disk stops spinning, a read/write head must either "land" or be pulled away onto a mechanical landing ramp from the disk surface.

When a read/write head is being positioned (or "loaded") onto the magnetic-recording disk to perform a read or write operation, the head "descends" off the mechanical landing ramp to its flying height. Similarly, when a read/write head is moved off (or "unloaded") the disk, the head "ascends" from its flying height to land on the mechanical landing ramp. However, when the read/write head ascends or descends, the mechanical movement often makes the instant flying height fluctuate and causes the read/write head to make physically "contact" with the surface of the magnetic-recording disk. Such contact is prone to occur when a read/write head performs loading/unloading sequences. Any contact is undesirable as it increases the likelihood of physical damage of the read/write head, and thus, decreases the reliability and the lifetime of the hard drive.

The read/write head of a HDD is mounted on a head slider and secured to a flexure that is flexibly mounted to an electrical lead suspension. The angle (or orientation) of the head slider is termed "attitude." Whenever the head slider is not flying over the surface of the magnetic-recording disk, the head slider is deemed to be in a free state. A measure of attitude of the head slider under this free state is termed "static attitude." The static attitude can be measured with reference to the pitch and roll axes of the suspension. Therefore, a pitch static attitude (PSA) and a roll static attitude (RSA) may be obtained by measuring the pitch and roll axes of the read/write head respectively. In an ideal situation, the value of both PSA and RSA should be zero degrees, meaning that the head slider is positioned perfectly when not flying. However, due to variation in the manufacturing process, mounting, and other factors, each HDD manufactured invariably has slightly different PSA and RSA parameters. Any non-zero static attitude is called a "static attitude deviation," as it deviates from the ideal number—zero. Non-zero PSA and RSA results in the read/write head being positioned in a less than optimal position and in more frequent and heavier contacts during loading/unloading sequences.

SUMMARY OF THE INVENTION

When a read/write head of a hard-disk drive (HDD) performs load/unload sequences, the head may make physically contact with the surface of the magnetic-recording disk. The orientation of a head slider may have a slight pitch and/or roll bias when the head slider is not in operation. This bias, commonly known as "static attitude," is unique to each HDD because of manufacturing process variation. The static attitude of a head slider also affects contact force, contact area, and contact location whenever a contact occurs. Therefore, a head slider design that minimizes the force of contacts therewith over a range of static attitude variation is desirable.

In one embodiment, a hard-disk drive includes a head slider that comprises an air bearing surface (ABS). The air bearing surface has, disposed thereon at a trailing edge of the air bearing surface, an electromagnetic transducer. The air bearing surface further comprises an inner diameter (ID) side rail and an outer diameter (OD) side rail. The ID side rail is longer in length than the OD side rail. The physical dimensions of the ID side rail are designed to reduce contact force between the head and the magnetic-recording disk when the head experiences a positive roll static attitude (RSA), and the physical dimensions of the OD side rail are designed to reduce contact force between the head and the magnetic-recording disk when the head experiences a negative RSA.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for an air bearing surface of a read/write head for minimizing the force of contact with a magnetic-recording disk are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Hard-Disk Drives

Figure 1:
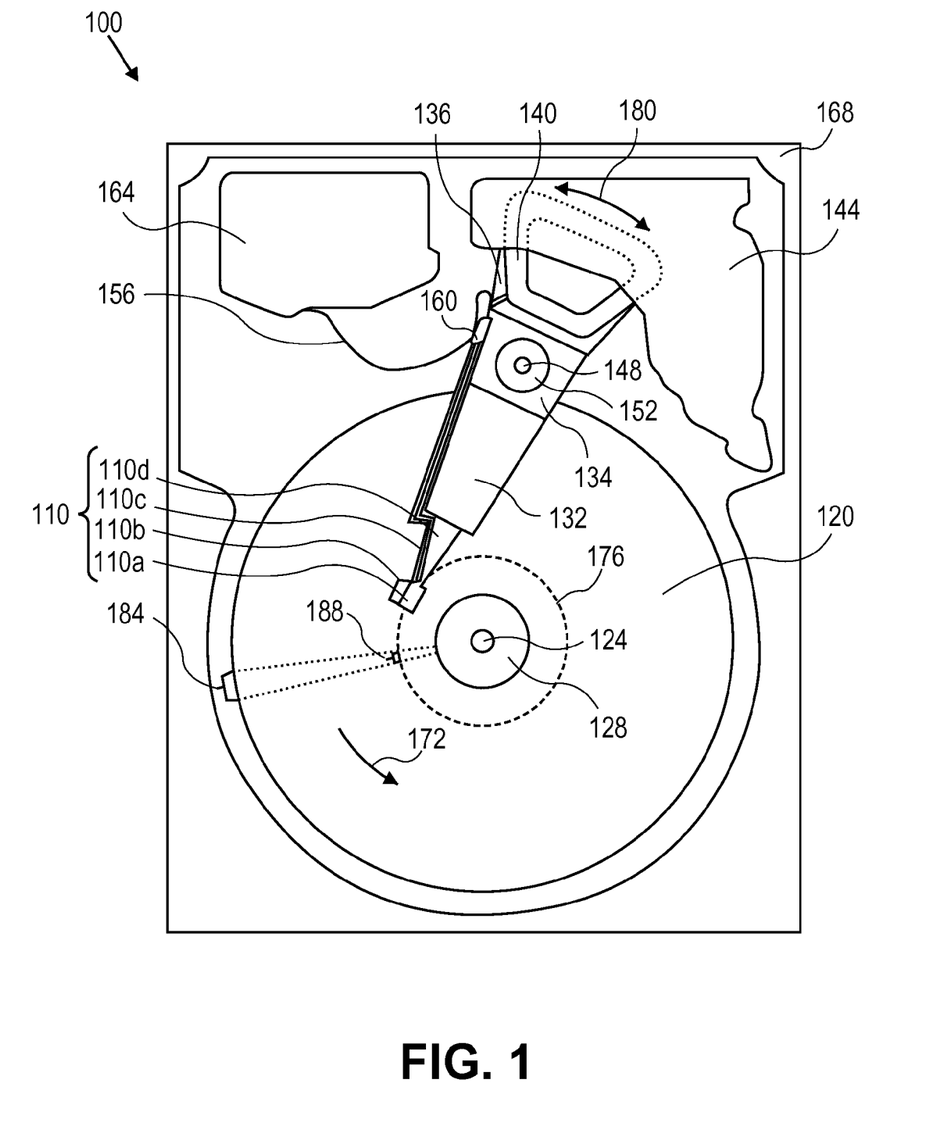
FIG. 1 is a plan view of an HDD according to an embodiment of the invention.

Prior to describing the air bearing surface (ABS) of a read/write head according to an embodiment, it may be helpful to understand the context in which the ABS of the read/write head will be employed. With reference to FIG. 1, a plan view of a HDD 100 is shown. FIG. 1 illustrates the functional arrangement of components of the HDD including a slider 110b including a magnetic-recording head 110a. The HDD 100 includes at least one HGA 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120. The head 110a includes a write element, a so-called writer, and a read element, a so-called reader, for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Figure 2:
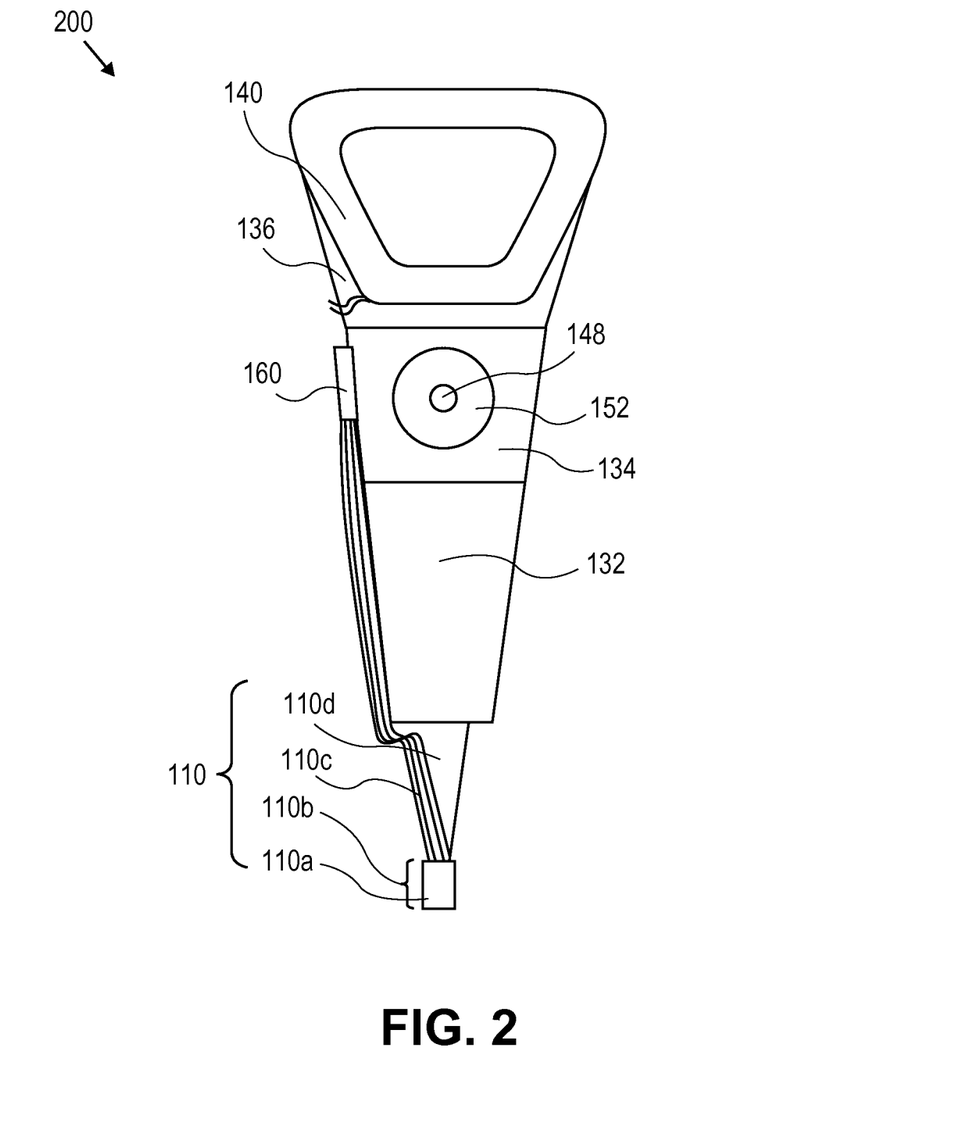
FIG. 2 is a plan view of a head-arm-assembly (HAA) including according to an embodiment of the invention.

With reference now to FIG. 2, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Figure 3:
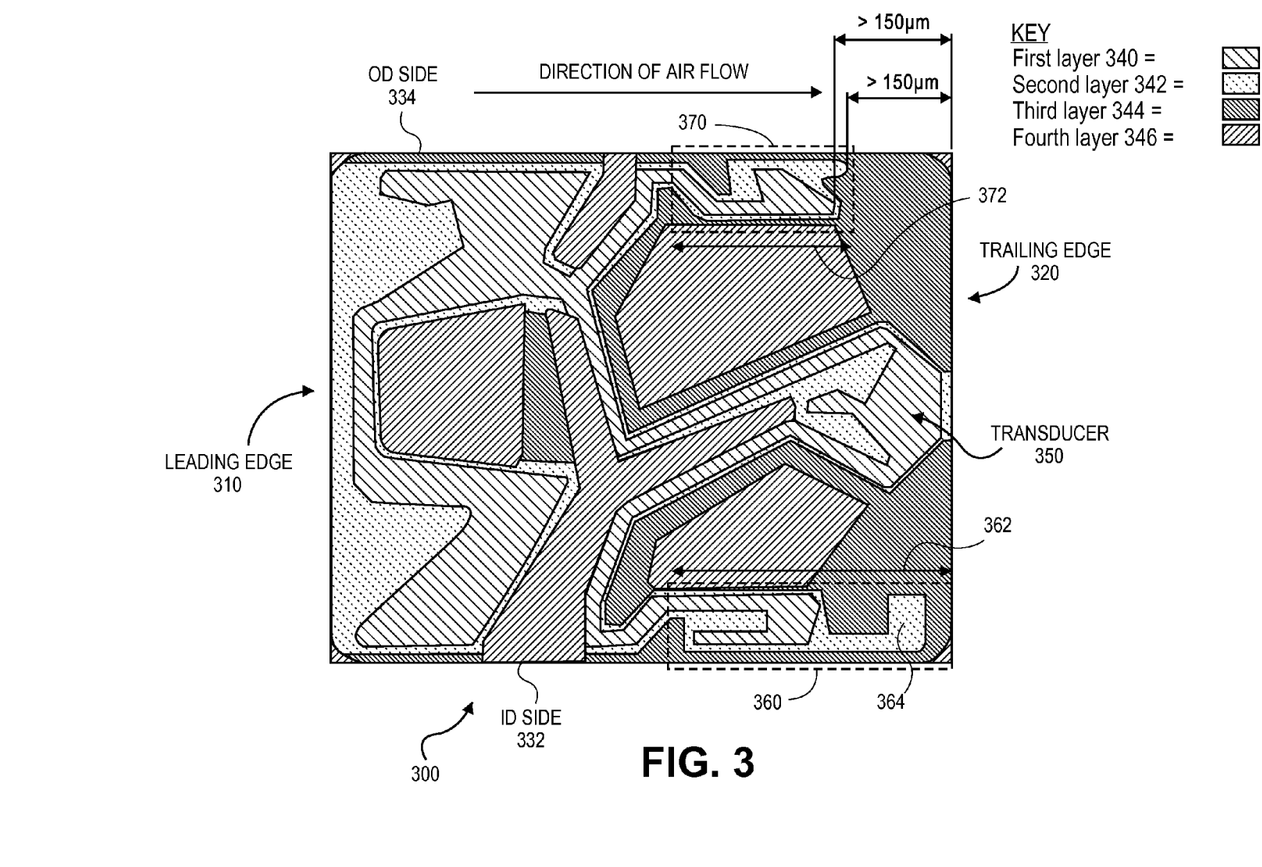
FIG. 3 is an illustration of an air bearing surface of a read/write head according to an embodiment of the invention.

An Air-Bearing Surface for Minimizing the Contact Force Between the Head and Disk FIG. 3 is an illustration of an air bearing surface 300 of a read/write head according to an embodiment of the invention. Air bearing surface 300 (hereafter ABS 300) possesses a leading edge 310 and a trailing edge 320. As shown in FIG. 3, air flows over ABS 300 in the direction of leading edge 310 to trailing edge 320. ABS 300 also possesses an inner diameter (ID) side 332 and an outer diameter (OD) side 334, with ID side 332 proximate the center of the magnetic-recording disk, and with OD side 334 proximate the circumference of the disk.

ABS 300 comprises a transducer 350 in the central portion of trailing edge 320. Transducer 350 is a component which converts electrical current into a magnetic field and vice-versa. Transducer 350 is used to read data from and write data to the electromagnetic surface of the disk.

ABS 300 comprises a plurality of features which promote the successful operation of transducer 350. These features may be created by etching into the plurality of layers forming ABS 300. The process of etching to remove portions of the layers of an air bearing surface of a read/write head to create features on the air bearing surface is well known to those in the art.

As shown in FIG. 3, ABS 300 is formed by etching the three outermost layers forming ABS 300. First layer 340 is the outermost layer of ABS 300. Underneath first layer 340 is second layer 342. Underneath second layer 342 is third layer 344. Underneath third layer 344 is fourth layer 346. Thus, fourth layer 346 is deeper than third layer 344, third layer 344 is deeper than second layer 342, and so on.

ABS 300 comprises an ID side rail 360 and an OD side rail 370. Both ID side rail 360 and OD side rail 370 may be formed by selective etching processes to create first, second, and third features on layers 340, 342, and 344 to expose layer 346. ID side rail 360 and OD side rail 370 have been used in the art to provide roll stiffness to the read/write head when the read/write head is flying over the disk.

In accordance with the present invention, ID side rail 360 has physical dimensions and geometry that reduces the force of a contact between the read/write head and the magnetic-recording disk. More specifically, ID side rail 360 has a length 362 such that ID side rail 360 extends toward the trailing edge 320 as much as possible. In a positive RSA situation (e.g., OD side 334 having a higher static height than ID side 332 when measured with reference to the surface of the magnetic-recording disk), the ID side 332 is able to compress air between the read/write head and the disk, thereby causing an upward force that lifts the read/write head away from the disk. This upward force is centered near the ID side rail 360, which helps delay the contact between the read/write head and the disk as well as helps reduce the force of contact between the read/write head and the disk. A larger and wider ID side rail 360 allows more air to be compressed by ID side rail 360 during loading/unloading sequences to create higher air pressure, and thus, more lift to the read/write head. Higher air pressure produces a lifting force on the ID side 332 of ABS 300, which reduces the contact force experienced on ID side 332 of ABS 300 when a contact occurs between the read/write head and the disk. This embodiment of the present invention is especially useful to minimizing contact between the head and disk during unloading sequences, when most contacts occur.

In another embodiment, ID side rail 360 includes a protrusion 364 in second layer 342, so that the ID side rail 360 forms substantially a U-shape having an opening directed towards the OD side 334 of the head slider, with the protrusion 364 extending toward the OD side 334 as much as possible. This configuration further increases the air pressure by creating more area and focusing the air pressure in proximity to ID side rail 360, which helps increase the upward lifting force experienced by the read/write head.

Similarly, OD side rail 370 has physical dimensions and geometry that reduces the force of a contact between the head and the magnetic-recording disk. In an embodiment, OD side rail 370 is modified to render OD side rail 370 as small as possible without reducing the ability of OD side rail 370 to provide roll stiffness to the read/write head while the read/write head is in flight. The physical dimensions of OD side rail 370 have a length 372 so that OD side rail 370 is positioned away from the trailing edge 320 as much as possible. In a negative RSA situation (e.g., OD side 334 having a lower static height than ID side 332 when measured with reference to the surface of the magnetic-recording disk), the OD side 334 is unable to compress air when unloading. Therefore, with this configuration, a smaller OD side rail 370 essentially moves features out of the way of the disk, thereby causing the read/write to contact the disk at a higher pitch and roll angles. As a result, the contact between the read/write head and the disk is delayed and the contact force is reduced. This embodiment of the present invention is especially useful to minimizing contact between the head and disk during unloading sequences.

Embodiments of the invention operate over a range of PSA. For example, the approaches taught herein may work for at least a range of 0.5° to 3° PSA, with 1°-2° PSA experiencing the most reduction in contact force.

In different embodiments, the size and the shape of ID side rail 360 and OD side rail 370 may differ, as long as the dimensions of the side rails achieve the objective of minimizing the number and force of contacts in positive and negative RSA and PSA situations. ID side rail 360 may have physical dimensions that maximize its footprint without impeding its ability to provide adequate roll stiffness to the read/write head. OD side rail 370 may have physical dimensions that minimize its footprint without impeding its ability to provide adequate roll stiffness to the read/write head.

For example, to maximize air pressure created by ID side rail 360, ID side rail 360 may be wider than OD side rail 370. Similarly, to delay the point of contact between the read/write head and the disk by moving features out of the way, OD side rail 370 may be narrower than ID side rail 360. To illustrate one example, in one embodiment (not depicted), ID side rail 360 extends all the way to the trailing edge of the head slider to gain extra air pressure during loading/unloading sequences. To illustrate another example, in one embodiment (not depicted), ID side rail 360 extends beyond the trailing edge of the head slider to gain extra air pressure during loading/unloading sequences.

Note that certain embodiments of the invention (not depicted in FIG. 3) may employ extended ID side rail 360 without contracted OD side rail 370, and vice versa.

Embodiments may operate over a variety of different etch depths. To illustrate an example, first etch depth 340 may be between 150 nanometers and 250 nanometers, second etch depth 342 may be between 400 nanometers and 700 nanometers, and third etch depth 346 may be between 900 nanometers and 2000 nanometers.

In some embodiments, first layer 340 in the geometry of OD side rail 370 in ABS 300 of the head is not present within 150 microns of trailing edge 320. In some other embodiments, the length 372 of OD side rail 370 is 235 microns or less, and the length 362 of ID side rail 360 is 350 microns or more. Still, in another embodiment, that the geometry of the OD side rail 370 includes a number of layers, wherein first layer 340 is not within 20 microns within the corner of second layer 342, and wherein the corner of second layer 342 is the portion of second layer 342 that is closest to (a) the trailing edge 320 and (b) the OD side 334 of the head slider.

Figure 4A:
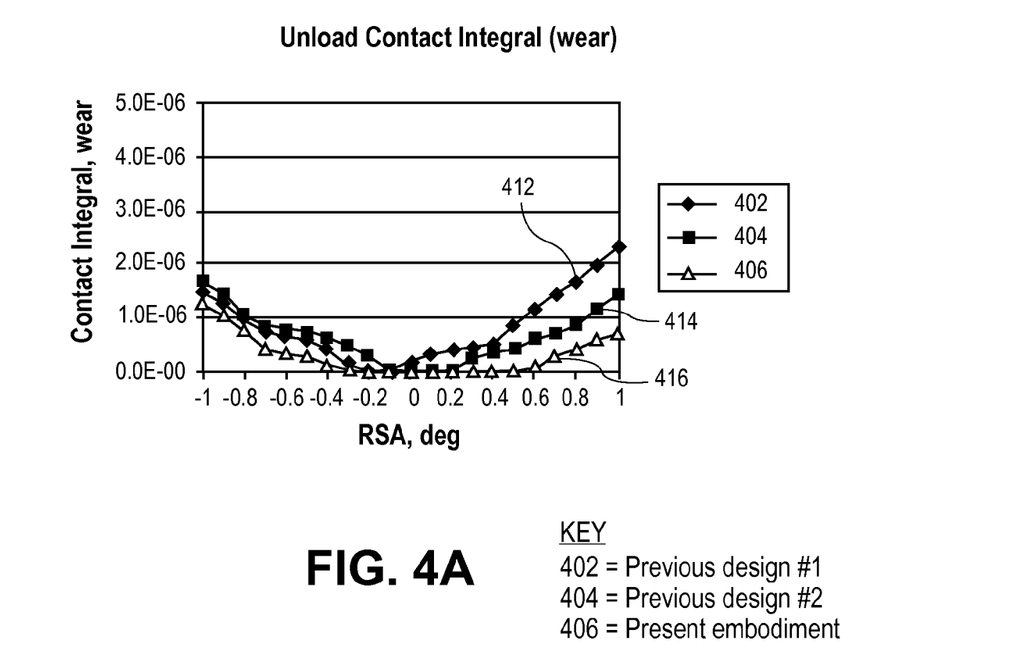
FIGS. 4A, 4B, and 4C are three figures illustrating exemplary characteristics of the air bearing surface of a head according to an embodiment of the invention.
Figure 4B:
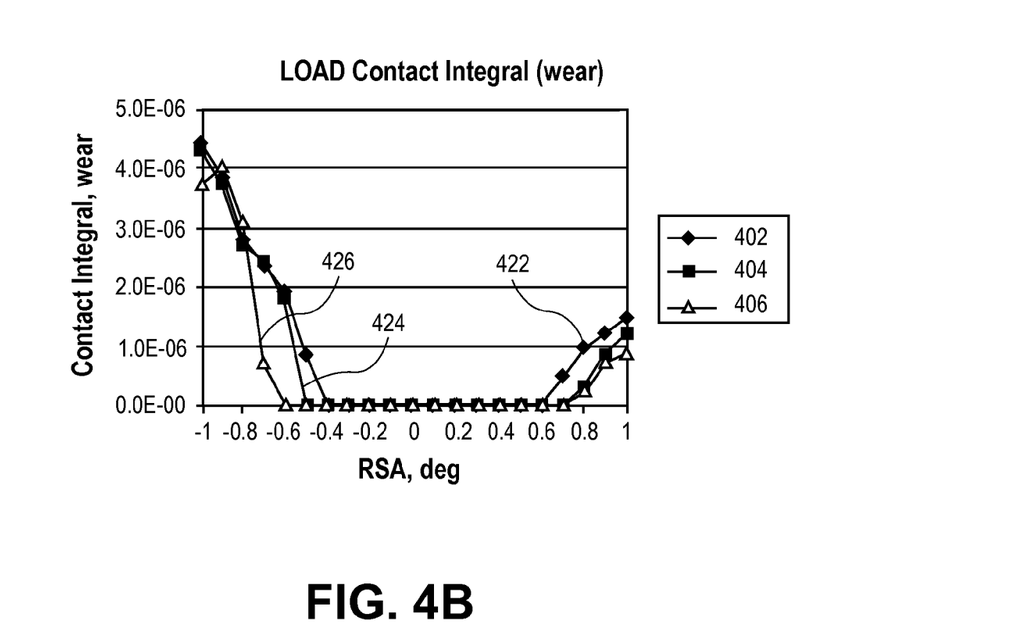
Figure 4C:
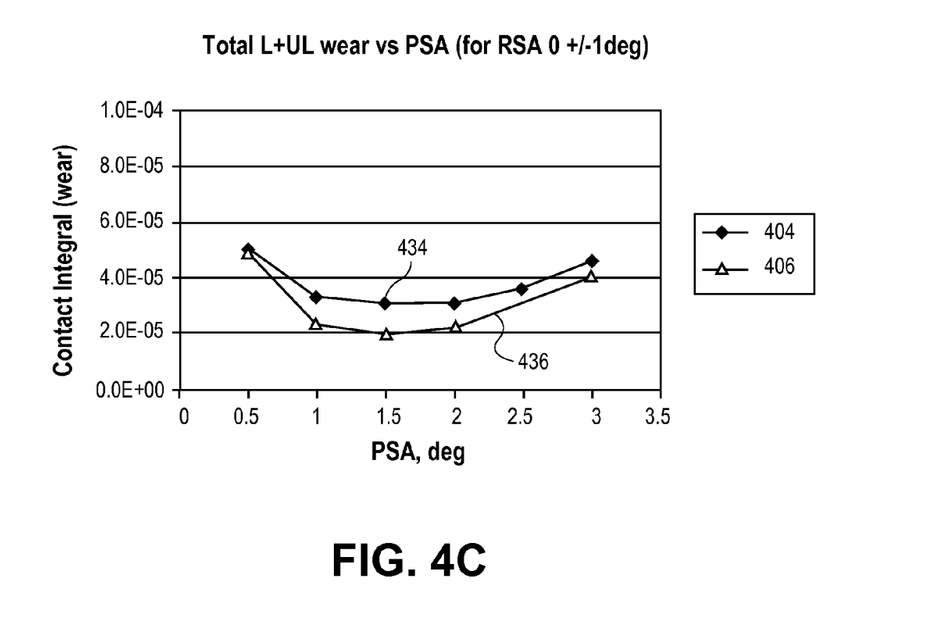

Embodiments of the invention, such as the embodiment depicted in FIG. 3, which employ both extended ID side rail 360 and contracted OD side rail 370 enjoy many benefits, such as reduced contact force which results in reduced wear of the ABS 300. FIGS. 4A, 4B, and 4C are line charts illustrating exemplary characteristics the air bearing surface of a head according to an embodiment of the invention. FIG. 4A shows the amount of wear experienced by the head when contact occurs during unloading sequences with respect to different RSA degrees. Relative wear comparisons may be performed by comparing, for a plurality of heads, the integral of (i.e., the area under a curve of a graph) of force over time for each head, where force is the force experienced by the head at a point in time during the period of contact between the head and the disk, and time measures the period of contact between the head and the disk. Designs 402 and 404 depict two previous ABS designs that do not incorporate the features of the present invention, while design 406 is an ABS design in accordance to an embodiment of the invention. As evidenced by FIG. 4A, design 406 shows a much larger tolerance to non-zero RSAs than previous designs. Specifically, curve 416 shows a much wider zero-contact region (where the contact integral is zero), and shows lower wear when there are contacts, both for positive RSA and negative RSA. In comparison, curve 412 and curve 414 both have a narrower zero-contact region, meaning previous designs 402 and 404 are more sensitive to non-zero RSAs, and contacts start to occur earlier responsive to a smaller RSA deviation. Moreover, with any given RSA, curve 412 and 414 both have higher contact integrals than curve 416, meaning design 402 and 404 experience more wear from contacts than design 406 in all RSA situations. Statistics from experiment show the total wear from contacts during unloading sequences is lowered by as much as 54% in certain embodiments.

FIG. 4B shows the amount of wear experienced by the head when contact occurs during loading sequences with respect to different RSA degrees. Similarly, designs 402 and 404 are two previous ABS designs that do not incorporate the features of the present invention, while design 406 is an ABS design in accordance to an embodiment of the invention, similar to the embodiment of FIG. 3. As evidenced by FIG. 4B, design 406 shows a larger tolerance to non-zero RSAs than prior designs. Specifically, curve 426 shows a wider zero-contact region (where the contact integral is zero), and mostly shows lower wear when there are contacts, both for positive RSA and negative RSA. In comparison, curve 422 and curve 424 both have a narrower zero-contact region, meaning previous designs 402 and 404 are more sensitive to non-zero RSAs, and contacts start to occur earlier responsive to a smaller RSA deviation. Moreover, with most given RSAs, curve 422 and 424 both have higher contact integrals than curve 416, meaning design 402 and 404 experience more wear from contacts than design 406 in most RSA situations. Statistics from experiment show the total wear from contacts during loading sequences is lowered by as much as 23% of the embodiments depicted in FIG. 4B.

FIG. 4C shows the total amount of wear experienced by the head when contact occurs during both loading and unloading sequences with respect to different PSA degrees. Similarly, design 404 is a previous ABS design that does not incorporate the features of the present invention, while design 406 is an ABS design in accordance to the present invention, similar to the embodiment of FIG. 3. As evidenced by FIG. 4C, design 406 shows a larger tolerance to non-zero PSAs than prior designs. Specifically, curve 436 shows lower wear when there are contacts in almost any given PSA situation. In comparison, curve 434 has higher contact integrals than curve 436, meaning design 404 experiences more wear from contacts than design 406 in almost all PSA situations.

Figure 5:
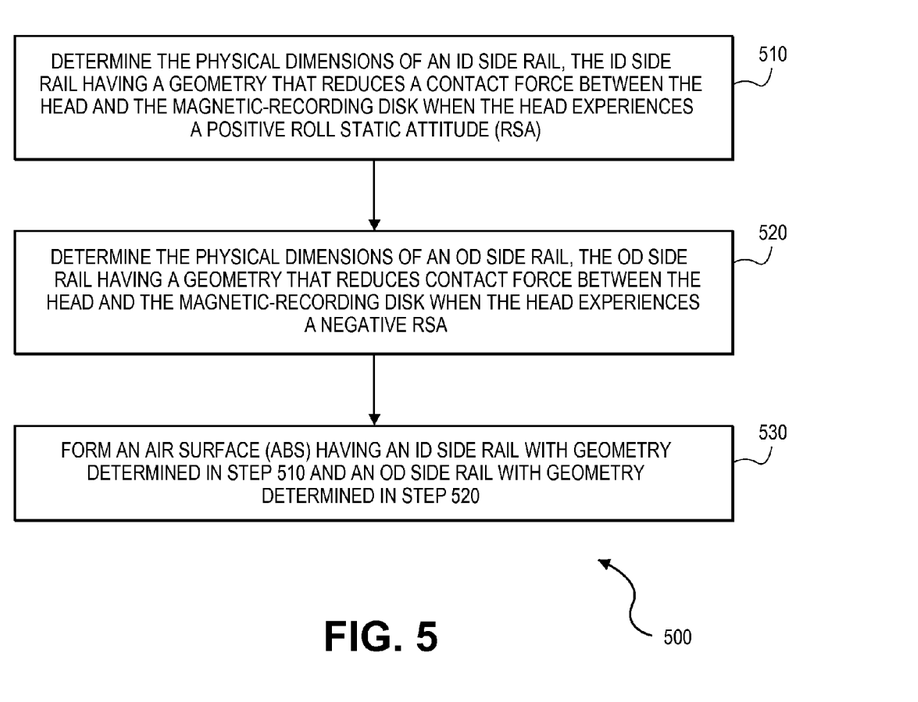
FIG. 5 is a flowchart illustrating the steps of forming the air bearing surface according to an exemplary embodiment of the invention.

FIG. 5 is a flowchart illustrating steps of forming the air bearing surface of a head according to an exemplary embodiment of the invention. In step 510, a geometry of an ID side rail is determined. The ID side rail has physical dimensions that are designed to reduce the contact force between the head and the magnetic-recording disk when the head experiences a positive roll static attitude (RSA). The ID side rail should be as long as possible without (a) becoming cost prohibitive and (b) impacting the stability of the read/write head during as it flies over the disk. In some embodiments, the ID side rail may extend all the way to the trailing edge. In some other embodiments, the ID side rail may extend beyond the trailing edge to form a protrusion. Additional details about how the geometry of an ID side rail should be determined are provided above.

In step 520, a geometry of an OD side rail is determined, wherein the OD side rail is positioned away from the trailing edge for reducing contact force between the head and the magnetic-recording disk when the head experiences a negative RSA. The details on how the geometry of an OD side rail should be determined are provided in corresponding paragraphs above.

In step 530, an air slider having an air bearing surface with an ID side rail and an OD side rail is formed according to the geometries determined in step 510 and step 520.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
   a head slider having an air bearing surface, wherein the air bearing surface comprises an inner diameter (ID) side rail and an outer diameter (OD) side rail, and wherein the ID side rail is longer in length than the OD side rail;
   a magnetic-recording disk rotatably mounted on a spindle;
   a drive motor having a motor shaft attached to the spindle for rotating the magnetic-recording disk; and
   a voice-coil motor configured to move the head to access portions of the magnetic-recording disk,
   wherein the ID side rail has a geometry that reduces a contact force between the head and the magnetic-recording disk when the head experiences a positive roll static attitude (RSA), and wherein the OD side rail has a geometry that reduces contact force between the head and the magnetic-recording disk when the head experiences a negative RSA, and
   wherein the geometry of the ID side rail includes a number of layers, and wherein a particular layer, directly underneath a topmost layer in the geometry of the ID side rail in the air bearing surface of the head slider, includes a U-shape feature comprising a leading edge protrusion which extends toward an outer diameter (OD) side of the head slider, an ID side portion, and a trailing edge protrusion closer to a trailing edge of the head slider than the leading edge protrusion and which extends toward the OD side of the head slider.

2. The hard-disk drive of claim 1, wherein the topmost layer in the geometry of the ID side rail in the air bearing surface of the head slider includes a U-shape having an opening directed towards a leading edge of the head slider.

3. The hard-disk drive of claim 1, wherein the geometry of the OD side rail includes a number of layers, and wherein a topmost layer in the geometry of the OD side rail in the air bearing surface of the head slider is not present within 150 microns of the trailing edge.

4. The hard-disk drive of claim 1, wherein the geometry of the OD side rail includes a number of layers, and wherein a particular layer, directly underneath a topmost layer in the geometry of the OD side rail in the air bearing surface of the head slider, is not present within 150 microns of the trailing edge.

5. The hard-disk drive of claim 1, wherein the length of the OD side rail is 235 microns or less.

6. The hard-disk drive of claim 1, wherein the length of the ID side rail is 350 microns or more.

7. A head slider, comprising:
   an air bearing surface; and an electromagnetic transducer disposed at a trailing edge of the air bearing surface, wherein the air bearing surface comprises an inner diameter (ID) side rail and an outer diameter (OD) side rail, wherein the ID side rail is longer in length than the OD side rail, wherein the ID side rail has a geometry that reduces a contact force between the head and the magnetic-recording disk when the head experiences a positive roll static attitude (RSA), wherein the geometry of the ID side rail includes a number of layers, and wherein a particular layer, directly underneath a topmost layer in the geometry of the ID side rail in the air bearing surface of the head slider, includes a U-shape feature comprising a leading edge protrusion which extends toward an outer diameter (OD) side of the head slider, an ID side portion, and a trailing edge protrusion closer to a trailing edge of the head slider than the leading edge protrusion and which extends toward the OD side of the head slider, and wherein the OD side rail has a geometry that reduces contact force between the head and the magnetic-recording disk when the head experiences a negative RSA.

8. The head slider of claim 7, wherein the topmost layer in the geometry of the ID side rail in the air bearing surface of the head slider includes a U-shape having an opening directed towards a leading edge of the head slider.

9. The head slider of claim 7, wherein the geometry of the OD side rail includes a number of layers, and wherein a topmost layer in the geometry of the OD side rail in the air bearing surface of the head slider is not present within 150 microns of the trailing edge.

10. The head slider of claim 7, wherein the geometry of the OD side rail includes a number of layers, and wherein a particular layer, directly underneath a topmost layer in the geometry of the OD side rail in the air bearing surface of the head slider, is not present within 150 microns of the trailing edge.

11. The head slider of claim 7, wherein the length of the OD side rail is 235 microns or less.

12. The head slider of claim 7, wherein the length of the ID side rail is 350 microns or more.

* * * * *